April 27, 1965

G. F. KLEPP 3,181,037

CONSTANT TIME DELAY CIRCUIT UTILIZING THERMAL DELAY SWITCHES CONNECTED IN TANDEM

Filed Feb. 7, 1963

Inventor
GEORGE F. KLEPP
By [signature]
Attorney 3,181,037
Patented Apr. 27, 1965

3,181,037

CONSTANT TIME DELAY CIRCUIT UTILIZING THERMAL DELAY SWITCHES CONNECTED IN TANDEM

George Francis Klepp, London, England, assignor to International Standard Electric Corporation, New York, N.Y., a corporation of Delaware Filed Feb. 7, 1963, Ser. No. 256,920
Claims priority, application Great Britain, Feb. 12, 1962, 5,304/62
2 Claims. (Cl. 317—141)

The invention relates to time delay devices depending upon thermal delay switches of the bimetallic kind.

A thermal delay switch has two main characteristics, the closing time, and the opening time. I have found that the normal manufacturing tolerances on thermal delay switches and their component materials lead to a considerable spread of these characteristics from switch to switch of the same type. Switches are made in various types to provide nominal operating times of, from, typically 10 seconds to 60 seconds. When it is desired to provide a much longer delay time, say from three to four minutes, the proposal to place several switches in series with one another so that they become operative consecutively to give a delay equal to the sum of their closing times (assuming that, upon operation, the switch closes a pair of contacts) becomes commercially impracticable because of the spread of the closing time tolerances. As is to be expected with this kind of switch, the closing and opening times are also very dependent upon variations of the power supplied to the heater.

The present applicant has found, however, that if both the closing and the opening times of a switch are added together, the variation from switch to switch of this sum is much smaller than that of the variation between the individual closing and opening times. Further and surprisingly I have found that the sum of the closing and opening times for a switch is nearly independent of heater power over a wide range.

According to the present invention there is provided a time delay device including a thermal delay switch of the heated bimetallic kind in which after applying energizing power to the thermal delay switch load circuit contacts controlled thereby are operated only after the contacts of the thermal relay switch have first been operated and then released again by de-energization of the thermal delay switch.

By the use of a plurality of thermal delay switches to provide a longer delay time, the invention provides a time delay device including a plurality of thermal delay switches of the heated bimetallic kind arranged in tandem with one another in which, after applying energizing power to a first of the thermal delay switches, load circuit contacts controlled by the other or another of the thermal delay switches are operated only after the contacts of both or all the thermal delay switches have first been operated one by one and then released again in sequence by de-energization of the first of the thermal delay switches.

The invention will be described more fully with reference to the accompanying drawings in which.

Figure 1:
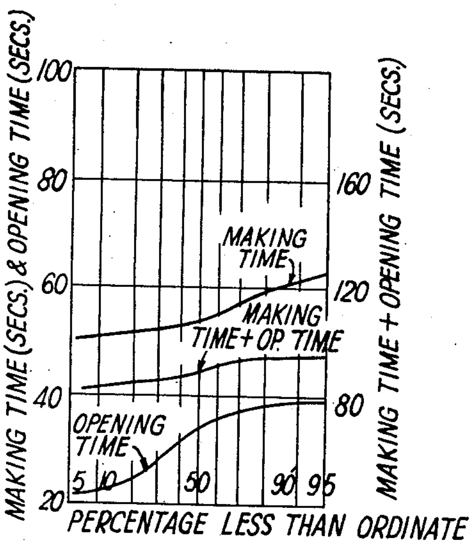
FIG. 1 shows curves illustrating the spread of time delay characteristics for switches of the same given type.

The curves of FIG. 1, which are copied from originals made on probability paper, illustrate, respectively, the spread of the "make" or operating time of a large batch of switches designed for a nominal delay time each of 60 seconds, the "break" or release time variations for the same switches, and, in the middle curve, the spread of the sums of the times for make and for break. From this it will be seen that the sum of the make and break times is tolerably constant from switch to switch and, with a suitable circuit arrangement, permits the employment of thermal delay switches in tandem.

Figure 2:
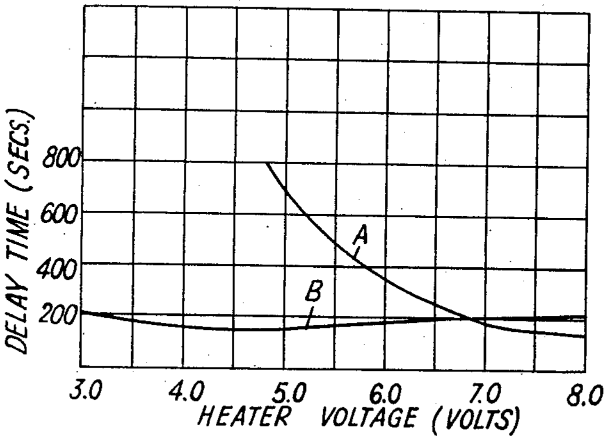
FIG. 2 illustrates the variation of time delay with heater voltage for sequential operation of one type of switch as compared with that obtained with the present invention.

In curve A of FIG. 2 the operating time of a tandem arrangement of five similar thermal delay switches is plotted against the heater voltage applied to each (nominally 6.3 volts). By way of contrast, in curve B the delay time is plotted as a function of heater voltage for an arrangement according to the invention employing three thermal delay switches of similar basic design to those for curve A, but each having a nominal operate time of 10 seconds; it will be seen that the delay time is remarkably independent of heater power.

Figure 3:
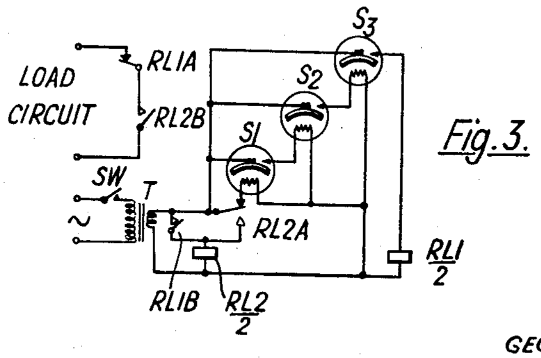
FIG. 3 is a circuit diagram of a device forming an embodiment of the present invention.

The circuit arrangement of the device according to the invention, to which the curve B of FIG. 2 relates, is illustrated in FIG. 3. Here three similar thermal delay switches $S_1$, $S_2$ and $S_3$ are arranged with one end of each of the heaters connected in common to one end of the secondary winding of mains transformer T, but the other ends of $S_2$ and $S_3$ are joined to the other end of the secondary winding of T through the contacts of $S_1$ and $S_2$ respectively. Heater power for $S_1$ is supplied through the break contacts of the change-over set of relay contacts RL2A. A manually operated switch SW is shown in series between one of the A.C. mains terminals and the primary of transformer T. A relay RL1 is connected through the contacts of thermal delay switch $S_3$ to the secondary winding of T, while a second relay, RL2, is connected across the secondary winding of transformer T through the make contacts RL1B of relay RL1 in parallel with the make contacts of the change-over set RL2A of relay RL2. A Load Circuit is connected in series with both the break contacts RL1A and the make contacts RL2B, so that the Load Circuit is made only when relay RL1 is unenergized and relay RL2 is energized.

The operation of the circuit of FIG. 3 is as follows. On closing the switch SW power flows through the heater of thermal delay switch $S_1$. After a delay equal to the operate time of $S_1$, heater power is supplied to $S_2$ and after a similar further delay is applied also to $S_3$. When $S_3$ becomes operated, relay RL1 closes, so causing the energization of relay RL2 and the opening of contacts RL1A in the Load Circuit Operation of RL2 changes over the contacts RL2A, so disconnecting the heated supply to $S_1$ and locking over the relay RL2. At the same time the contacts RL2B in the Load Circuit are closed. The relays should be such, or should be so adjusted, that the contacts RL1A open before RL2B closes, in order to avoid the Load Circuit being made momentarily before the end of the desired sequence of operations.

The heater supply to $S_1$ having been broken, after a delay equal to the release time of this thermal delay switch its contacts open and so interrupt the heater supply to $S_2$. After a further delay $S_2$ opens and causes $S_3$ to release after a yet further delay. When $S_3$ opens, relay RL1 drops off, but RL2 remains locked over its contacts RL2A, and the contacts RL1A make again, so completing the Load Circuit.

Neglecting the relay operate and release times, it will be seen that the total time delay afforded by the circuit of FIG. 3 is the sum of all the operate and of all the release times of the thermal delay switches $S_1$, $S_2$ and $S_3$.

Although three thermal delay switches are included in the embodiment of FIG. 3, it will be appreciated that the circuit may be modified to cater for any desired number of thermal delay switches, including but one. Modifications to the relay switching arrangement within the scope of the invention will occur to those skilled in the art; for example in place of the change-over set of contacts RL2A a separate pair of break contacts on either of the relays may be provided for interrupting the heater supply to $S_1$, separate make contacts then being provided on RL2 in parallel with RL1B. Again, the invention is not limited to thermal delay switches incorporating only a pair of "make" contacts.

It is to be understood that the foregoing description of specific examples of this invention is not to be considered as a limitation on its scope.

What I claim is:

1. A time delay device including a plurality of thermal delay switches each having a bimetallic element, a heater for the bimetallic element and contacts actuated by the bimetallic element when heated to complete the heater circuit of the next succeeding thermal delay switch, the thermal delay switches being connected in tandem with their heaters other than that of the first one of said thermal delay switches being coupled to the switch contacts of the preceding thermal delay switch and being energized by operation of the preceding thermal delay switch, a source of power for energizing said heaters, means coupling said source of power to said heaters and said thermal delay switch contacts, relay switching means coupled to said thermal delay switches and having contacts for a load circuit to be operated after a time delay equal to the time required for energizing sequentially the heaters of all the thermal delay switches and means controlled by said relay means to de-energize said heaters sequentially subsequent to the removal of heater power from said first one of said thermal delay switches, the energizing circuit being independent of the load circuit.

2. A time delay device according to claim 1 wherein said relay switching means comprises a first and a second relay, the contacts of said first and second relays being arranged in the load circuit to close the same only when said first relay is unenergized and said second relay is energized, said first relay being coupled to the switch contacts of the last thermal delay switch and being energized by operation of said last thermal delay switch, said second relay being coupled to said first relay and having contacts controlling the heaters of said first thermal delay switch and being arranged for energization by operation of said first relay and after being energized by said first relay remains locked over and said contacts controlling said heater of said first thermal delay switch open to interrupt power to said heater of said first thermal delay switch and sequentially the heaters of said succeeding thermal delay switches and de-energize said first relay whereby the load circuit is closed.

References Cited by the Examiner

UNITED STATES PATENTS

| | | | |
|---|---|---|---|
| 2,426,906 | 9/47 | Vaughan | 317—40 |
| 3,113,243 | 12/63 | Boyd | 317—40 X |

SAMUEL BERNSTEIN, *Primary Examiner.*